United States Patent [19]

Kumar et al.

[11] Patent Number: 4,600,769

[45] Date of Patent: Jul. 15, 1986

[54] AMINE TERMINATED BISASPARTIMIDE POLYMER

[75] Inventors: Devendra Kumar, Delhi, India; George M. Fohlen, Millbrae; John A. Parker, Los Altos, both of Calif.

[73] Assignee: The United States of America as represented by the Administrator of the National Aeronautics and Space Administration, Washington, D.C.

[21] Appl. No.: 739,760

[22] Filed: May 31, 1985

Related U.S. Application Data

[63] Continuation of Ser. No. 561,702, Dec. 15, 1983, abandoned.

[51] Int. Cl.$^4$ ............................................. C08G 73/10
[52] U.S. Cl. .................................. 528/322; 428/473.5; 528/170; 528/220; 528/321
[58] Field of Search ................ 528/322, 170, 220, 321

[56] References Cited

U.S. PATENT DOCUMENTS 3,740,378  6/1973  Crivello ............................. 528/322

3,998,904  12/1976  Balme et al. ....................... 528/322

OTHER PUBLICATIONS

Kumar et al., High Temperature Resins Based on Aromatic Amine-Terminated Bisaspartimides.
Kumar et al., Matrix Resins Based on Aromatic Amine-Terminated Bisaspartimides.

*Primary Examiner*—Harold D. Anderson
*Attorney, Agent, or Firm*—Darrell G. Brekke; John R. Manning; Robert D. Marchant

[57] ABSTRACT

Novel amine terminated bisaspartimides, especially 4,4'-bis{N$^2$-[4-(4-aminophenoxy)phenyl]aspartimido} diphenylmethane are prepared by a Michael-type reaction of an aromatic bismaleimide and an aromatic diamine in an aprotic solvent. These bisaspartimides are thermally polymerized to yield tough, resinous polymers crosslinked through —NH— groups. Such polymers are useful in applications requiring materials with resistance to change at elevated temperatures, e.g., as lightweight laminates with graphite cloth, molding material prepregs, adhesives and insulating material.

6 Claims, No Drawings

AMINE TERMINATED BISASPARTIMIDE POLYMER

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

This application is a continuation of application Ser. No. 561,702, filed Dec. 15, 1983, now abandoned.

BACKGROUND OF THE INVENTION

1. Field of the Invention

This invention relates to novel aromatic amine terminated bisaspartimides which are useful as precursors for preparing novel, cross-linked, high temperature stable polymeric resins, and to a method for making the bisaspartimides. More particularly, the invention relates to novel 4,4'-bis{$N^2$-[4-(4-aminophenoxy)phenyl]aspartimido}diphenylmethane, which may be thermally polymerized to produce a tough polymer. It further relates to a process for preparing these bisaspartimide compounds by a Michael-type reaction of an aromatic bismaleimide and an aromatic diamine in an aprotic solvent. It also relates to novel cloth laminates incorporating the polymers of this invention.

2. Description of the Prior Art

High temperature resistant polymers are used extensively in advanced aerospace structures in which structural integrity must be retained during continuous use at temperatures of 325 degrees C. and above. The stringent requirements of space technology and of other industrial applications for thermal protective materials have led to the development of several classes of heat- and flame-resistant heterocyclic polymers. Aromatic polyimides, developed during the 1960s, have met these requirements to a large extent. They are prepared by a condensation reaction. Loss of desirable mechanical properties and problems of reproducibility have been observed because of voids created by the elimination of water during their formation in situ, difficulty in the removal of high boiling point solvents, or both. As a result, the use of these polyimides as laminating resins or for adhesives has been limited. Such polyimides are disclosed, for example, in the following references: C. E. Sroog, J. Polym. Sci., 16, 1191 (1967); M. L. Wallach, J. Polym. Sci. A-2, 5, 653 (1967); R. Ikeda, J. Polym. Sci., B, 4, 353 (1966); C. E. Sroog, A. L. Endrey, S. V. Abramo, C. E. Bear, W. M. Edwards, and K. L. Oliver, J. Polym. Sci. A, 3, 1373 (1965); R. A. Dine-Hart and W. W. Wright, J. Appl. Polym. Sci., 11, 609 (1967).

Initial attempts to overcome these processability problems led to the development of addition polyimides based on short, preimidized segments which polymerize thermally through end groups without loss of volatiles, such as disclosed by F. Grundschober and J. Sambeth, U.S. Pat. Nos. 3,380,964; 3,523,996; French Pat. No. 1,455,514; Chem. Abstr., 65, 10746 (1966). However, these addition polyimides were found to be inherently brittle because of extensive cross-linking that occurs during polymerization.

P. Kovacic, U.S. Pat. No. 2,818,405; Chem. Abstr. 52, 5018e (1958), reported the reaction of amine capped liquid elastomeric prepolymers with bismaleimides to afford polymers. However, these elastomer based polymers were not heat resistant. M. Bargain et al, U.S. Pat. No. 3,562,223; Chem. Abstr. 72, 4047 (1970) disclose cross-linked resins obtained by the melt polymerization of bismaleimide and the addition of diamine to the melt in ratios of 1.2:1 to 50:1 with further polymerization. The prepolymers thus formed are used to prepare prepregs via their N-methylpyrrolidone solution to give laminates. However, these resins show a tendency to polymerize in solution, significantly increasing the solution viscosity and causing processing difficulties.

A wide variety of polyimide resins derived from bismaleimides and/or aromatic diamines, in combination with various other materials, are known in the art. Such resins are disclosed in, for example, the following U.S. Pat. Nos.: 3,671,490; 3,740,378; 3,766,138; 3,855,239; 3,897,393; 4,020,303; 4,060,515; 4,075,171; 4,116,937; 4,280,946; 4,283,521; 4,316,843; 4,273,916; 4,346,206. See also J. V. Crivello, J. Polym. Sci., 11, 1185 (1973).

While the art pertaining to high temperature stable resins and precursors is a well developed one, there is a continuing need for a polyimide binder that can be used as a matrix for low void fiber reinforced composites that retain favorable properties and have thermooxidative stability. Such binders should also be capable of being used in rapid, high pressure, matched-die molding, as well as in lower pressure vacuum bag autoclave molding. It has not been found to be desirable to use a high molecular weight polymer in a solution as a binder because the solution is too viscous at a high solids content for handling. At low solids concentration, there is usually insufficient resin pick up in one pass in the pre-pregging operation.

Whereas other mixed bismaleimide-aromatic amine systems polymerize thermally by reaction of vinyl groups with either other vinyl groups or with free amino groups, depending on the stoichiometry of the system, the herein described materials, having all or substantially all their vinyl group previously prereacted with one amino group of an aromatic diamine, is believed to cure by an imide ring opening reaction to form amides. It is also known that an imide ring opening reaction occurs as a side reaction of an amino acid (proline) reacting with a substituted ester, as reported by J. Savrda, J. Org. Chem., 42, 3199 (1977).

SUMMARY OF THE INVENTION

A binder which meets these requirements is provided by the novel aromatic amine terminated bisaspartimides herein disclosed, which polymerize with cross-linking at moderate temperatures to provide rigid, tough, cured structures. The bisaspartimides of this invention have the formula:

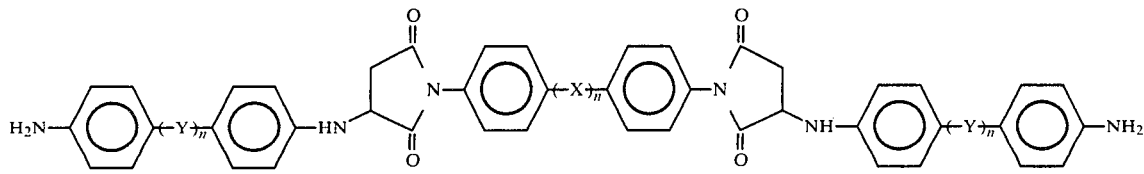

X in the above formula is a divalent organo radical, such as a hydrocarbon group containing from 1 to 4 carbon atoms, or other divalent radicals capable of linking two benzene rings, such as a —CH$_2$—group, a

group, —O—, —S—, —CO— or —SO$_2$—. Y is a divalent organo radical, such as a hydrocarbon group containing from 1 to 4 carbon atoms, such as —CH$_2$— group, a

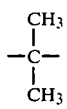

group, or other divalent radicals capable of linking two benzene rings, such as —O— or —S— or —SO$_2$— or —CO— or the like, and n is, independently in each case, an integer of 0 or 1.

The method for preparing an aromatic amine terminated bisaspartimide in accordance with this invention comprises reacting an aromatic diamine and an aromatic bismaleimide in a mol ratio of about 2:1 with an acid catalyst in an aprotic solvent. The method desirably employs an aromatic diamine having the formula:

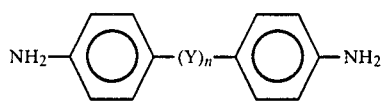

and an aromatic bismaleimide having the formula:

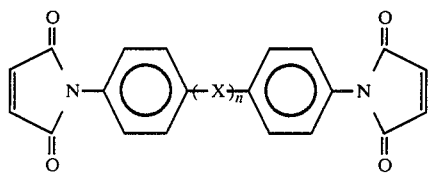

In these formulas, X, Y and n have the meaning given previously. In an especially preferred embodiment, the acid catalyst is glacial acetic acid, the aprotic solvent is dimethylacetamide, and the reaction is carried out in an inert atmosphere, such as nitrogen.

The polymer prepared by thermally polymerizing the novel bisaspartimides of this invention is a cross-linked polymer having recurring structural units of the formula:

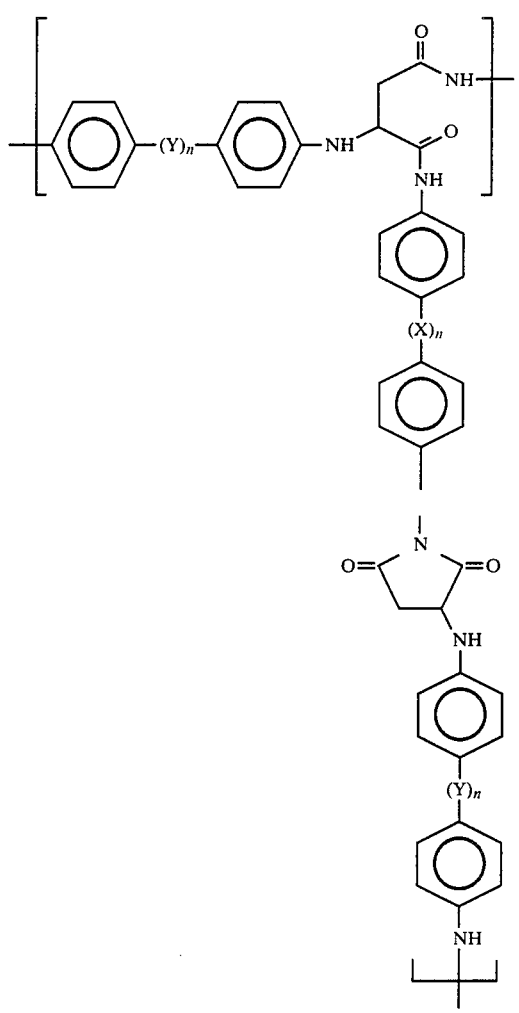

in which X, Y and n have the meaning given previously. While applicants do not wish to be bound by any particular theory, it is believed that the cross-linked polymers of this invention are rigid and tough, rather than brittle as in the case of prior cross-linked polyimides, because larger structural units are available for internal molecular motion after cross-linking.

The attainment of the foregoing and related objects, advantages and features of the invention should be more readily apparent to those skilled in the art, after review of the following more detailed description of the invention.

DETAILED DESCRIPTION OF THE INVENTION

Suitable specific examples of aromatic bismaleimides for preparing the novel bisaspartimides of this invention include: 4,4'-bismaleimidodiphenylmethane; 4,4'-bismaleimidodiphenylether; 4,4'-bismaleimidobiphenyl; 4,4'-bismaleimidodiphenylsulfone; 4,4'-bismaleimidodiphenylthioether; 4,4'-bis-maleimidodiphenyldimethylsilane; 1,4-phenylenebismaleimide; 1,3-phenylenebismaleimide and the like. These and similar bismaleimides may be prepared by the condensation of maleic anhydride with a required equivalent ratio of the corresponding aromatic diamines, in an acetone solvent, using the method disclosed by D. Kumar, *Chem. Ind. London*, 21, 189 (1981). Suitable specific examples of aromatic diamines that may be reacted with the above and similar bismaleimides to give the bisaspartimides of this invention include 4,4'-diaminodiphenylmethane; 4,4'-diaminodiphenylether; 4,4'-diaminodiphenyl sulphide; 4,4'-diaminodiphenylsulfone; 3,3'-diaminodiphenylsulfone; 4,4'-diaminobiphenyl; 4,4'-diaminodiphenyldimethylsilane; 4,4'-diaminodiphenylpropane; benzidine; 4,4'-diaminophenoxyphenylene; 3,3'-diaminophenoxyphenylene; 2,2-bis(3-aminophenyl)hexafluoropropane; 3,2-bis(4-aminophenyl)hexafluoropropane.

In order to obtain amine terminated bisaspartimides in accordance with the above formula, it is important that a mol ratio of the aromatic diamine to bismaleimide of about 2:1 be employed. There is a competing reaction to produce a linear polyimide, which will occur at other mol ratios, as taught in U.S. Pat. No. 3,740,378.

Suitable specific examples of acid catalysts which may be employed in the practice of the process of this invention include, for example, organic carboxylic acids, such as acetic, propionic, chloroacetic, dichloroacetic, trichloroacetic, trifluoroacetic, cyanoacetic, formic acid, and the like; mineral acids, such as hydrochloric acid, hydrobromic acid, flouroboric acid, and the like. These acid catalysts may be employed either singly or as mixtures. In many cases, they also serve as part of the solvent for the aromatic amines and bismaleimide reactants.

Suitable specific examples of aprotic solvents suitable for practice of the invention include benzonitrile, acetonitrile, dimethylacetamide, dimethylformamide, N-methylpyrrolidone, nitromethane, nitrobenzene, xylene, benzene, toluene, acetone, chloroform, methylene chloride, and the like. The organic solvents may be employed either singly or as mixtures.

In practice, the process of this invention is desirably carried out at an elevated temperature, such as refluxing temperature. For example, a temperature about 110 degrees to 120 degrees C. for six to seven hours will produce the desired polyimide precursor bispartimide compounds in good yield. Lower temperatures could be employed, but would require longer reaction times for comparable yields.

The following non-limiting examples describe preferred embodiments of the invention further, including a description of the high temperature resins obtained from polymerization of the novel bisaspartimides prepared in accordance with the novel process of this invention.

In the following examples, the reactions were carried out in a three-necked flask equipped with a nitrogen inlet and outlet. The reaction mixtures were stirred mechanically and heated in an oil bath. The reagents were added in the sequences and stoichiometries indicated below. The method described is that which gave the optimum yield of the compound in each case and does not represent the sole reaction conditions which produce the compounds in each case.

In the following examples the compounds listed in Table I below are utilized:

TABLE I

| Compound | Name |
| --- | --- |
| I | 4,4'-diaminodiphenylmethane |
| II | 4,4'-diaminodiphenylether |
| III | 4,4'-bismaleimidodiphenylmethane |
| IV | 4,4'-bismaleimidodiphenylether |
| V | 4,4'-bis{$N^2$—[4-4(-aminobenzyl)phenyl]-aspartimido}diphenylmethane |
| VI | diacetylated derivative of compound V, used for polymer characterization |
| VII | 4,4'-bis{$N^2$—[4-(4-aminophenoxy)aspartimido}diphenylether |
| VIII | diacetylated derivative of compound VII |
| IX | 4,4'-bis{$N^2$—[4-(4-aminophenoxy)phenyl]-aspartimide}diphenylmethane |
| X | 4,4'-bis{$N^2$—[4-(4-aminobenzyl)phenyl]-aspartimido}diphenylether |
| XI | N—[4(4'-aminobenzyl)phenyl]-aspartimidobenzene |
| XII | 4,4'-bis(N—phenyl)aspartimido]diphenylmethane |
| XIII | polymer of compound IX |
| XIV | polymer of compound V |

EXAMPLE 1

The compound 4,4'-bis{$N^2$-[4-(4-aminobenzyl)phenyl]aspartimido}diphenylmethane was prepared as follows: to a continuously stirred solution of 4,4'-diaminodiphenylmethane (I) (5.94 g, 0.03 mol) in dimethylacetamide (50 ml) under a nitrogen atmosphere, 4,4'-bismaleimidodiphenylmethane (III) (5.37 g, 0.015 mol) was added. To the resulting brown solution, glacial acetic acid (1–2 ml) was added and continuously stirred at 110 to 120 degrees for 6–7 hours, under nitrogen. After cooling, the solution was poured over crushed ice. The light brown solid obtained was filtered and washed with cold water. The brownish-yellow solid obtained after drying was macerated with dry warmed acetone. The soluble portion was filtered and concentrated. Addition of a few drops of petroleum ether to this cooled, viscous acetone solution gave a light yellow solid. The process of crystallization was repeated to give the desired compound (V) (7 g).

ANAL. for $C_{47}H_{42}N_6O_4$: C, 74.8%; H, 5.57%; N, 11.14%. Found: C, 74.5%; H, 5.3%; N, 10.9%.

EXAMPLES 2–4

The procedure of Example 1 was repeated, utilizing the corresponding aromatic bismaleimides and aromatic diamines substituted for the aromatic bismaleimide and aromatic diamine used in Example 1 to give compound (VII), 4,4'-bis{$N^2$-[4-(4-aminophenoxy)phenyl]aspartimido}diphenylether from II and IV; compound (IX), 4,4'-bis{$N^2$-[4-(4-aminophenoxy)phenyl]aspartimido}-diphenylmethane from II and III; compound (X), 4,4'-bis{$N^2$-[4-(4-aminobenzyl)phenyl]aspartimido} diphenylether from I and IV. The results obtained and analysis of the resulting compounds are shown in Table II below.

4,600,769

TABLE II

| Compound* | Bismaleimide Type | Amount (g) | Amount (mol) | Diamine Type | Amount (g) | Amount (mol) | Microanalysis (%) | | | | |
|---|---|---|---|---|---|---|---|---|---|---|---|
| | | | | | | | | C | H | N |
| (VII) | IV | 5.40 | 0.015 | II | 6.00 | 0.03 | Calcd: | 69.47 | 4.73 | 11.05 |
| | | | | | | | Found: | 69.20 | 4.40 | 10.60 |
| (IX) | III | 5.37 | 0.015 | II | 6.00 | 0.03 | Calcd: | 71.26 | 5.20 | 11.08 |
| | | | | | | | Found: | 71.10 | 5.20 | 10.60 |
| (X) | IV | 5.40 | 0.015 | I | 5.94 | 0.03 | Calcd: | 73.02 | 5.29 | 11.11 |
| | | | | | | | Found: | 72.60 | 5.10 | 10.80 |

*Compounds (VI) and (VIII), not listed above, were acetylated derivatives of (V) and (VII), respectively.

The identity of each compound was confirmed by NMR and IR spectroscopy. The presence of amino terminals in bisaspartimdes is confirmed by their reaction with nadic anhydride, pyromellitic anhydride and acetic anhydride, respectively.

EXAMPLE 5

The compound N-[4-(4'-aminobenzyl)phenyl]aspartimidobenzene, compound (XI), was prepared as follows: to a vigorously stirred solution of 4,4'-diaminodiphenylmethane (29.7 g, 0.15 mol) in dimethylacetamide (200 ml) in a nitrogen atmosphere, N-phenylmaleimide (26.0 g, 0.15 mol) was added. To the resulting brown solution, glacial acetic acid (1-2 ml) was added and the reaction was heated with stirring at 110-120 degrees C. for 6-7 hours. On cooling, the reaction solution was poured over crushed ice. The light yellow solid obtained was filtered, washed with water, and dried (yield 40 g). Repeated crystallization of the yellow solid from methanol-acetone did not give a pure compound. Thin layer chromatography examination of the resulting product showed two spots different from the starting compounds. Preparative TLC was used for the separation of these two compounds. The lower major spot was characterized as the required compound, which was confirmed by NMR and infrared spectroscopy. The other spot was identified by NMR and IR spectroscopy as the compound 4,4'-bis[(N-phenyl)-aspartimido]-diphenylmethane, compound (XII).

EXAMPLE 6

Compounds (V), (VII), (IX) and (X) were tested for their melting points in a capillary tube, and did not show any sharp melting points. The curing behavior of compounds (V), (VII), (IX) and (X) was determined by differential scanning calorimetry (DSC) in nitrogen. The temperature of first energy release $T_i$ (start of polymerization), the exothermic peak position $T_{max}$, and the temperature of termination of polymerization $T_f$ were determined from the DSC trace for compound (VII), and are presented below in Table III.

TABLE III

| Characteristic DSC Temperatures for Bisaspartimide (VII) | | | |
|---|---|---|---|
| Sample | $T_i(°C.)$ | $T_{max}(°C.)$ | $T_f(°C.)$ |
| (VII) | 145 | 157,175 | 230 |

EXAMPLE 7

Compounds (V), (VII), (IX) and (X) were polymerized to give tough transparent brown polymers. The relative thermal stability of the compound (IX) and (V) polymers (XIII) and (XIV) was investigated by dynamic thermogravometry in air and nitrogen atmospheres. These resins were stable in air and nitrogen atmospheres up to about 370 degrees C., but started losing weight above that temperature. A two-step decomposition reaction was observed with both polymers XIII and XIV, the first decomposition being comparatively shorter.

Similar polymerization studies were carried out using compounds (VII) and (X) but the resulting polymers were more brittle in nature than those of compounds (V) and (IX). These results indicate that the desired ratio of ether and methylene amine used in preparing compound (IX) provides the preferred properties.

EXAMPLE 8

Test laminates were prepared by coating graphite cloth (8 harness satin weave cloth, designated as a style 133 fabric), with a DMF/acetone solution of compound (IX) and drying the resulting prepregs in an oven at 110-115 degrees C. for ten minutes. The prepregs were assembled in 4 or 9 plies and pressed between aluminum plates covered with a teflon film release sheet in a press maintained at 170 degrees C. for thirty minutes. The temperature was then kept at 225 degrees C. for two hours, and then at 250 degrees C. for thirty minutes. The pressure during curing was maintained at about 100 psi. The curing may also be carried out in an autoclave, using a vacuum bag.

Laminates from compound (V) were prepared in a similar way. The resin content of the laminates was determined by boiling with concentrated nitric acid.

Table IV below shows the data from physical tests done on the graphite composites made with resins of compounds (V) and (IX). Comparative results are also provided for graphite laminates made with bismaleimide of 4,4'-diaminodiphenylmethane and with the commonly used Ciba Geigy MY-720 epoxy system, cured with diaminodiphenyl sulfone (DDS). The results obtained show that the resin of compound (IX) is comparable to the epoxy system and superior to the bismaleimide system. The mechanical property value may be altered somewhat by varying the processing conditions.

TABLE IV

| | Physical Properties of Graphite Cloth Laminates | | | |
|---|---|---|---|---|
| | Bisaspartimides | | | |
| Property tested | Resin (V) | Resin (IX) | Epoxy[a] | Bismaleimide[b] |
| Resin content (%) | 18 | 18 | 25 | 34.3 |

TABLE IV-continued
Physical Properties of Graphite Cloth Laminates

| Property tested | Bisaspartimides | | Epoxy[a] | Bismaleimide[b] |
| --- | --- | --- | --- | --- |
| | Resin (V) | Resin (IX) | | |
| Density (g/cm$^3$) | 1.31 | 1.31 | 1.57 | 1.554 |
| LOI (ASTM D2863; % O$_2$) | 54.2 | 56.2 | 45 | 58.4 |
| Flammability | Nonburning | Nonburning | Nonburning | Nonburning |
| Flexural strength (psi) | 56,102 | 68,020 | 79,808 | 40,014 |
| (ASTM D790; MN/m$^2$) | 386 | 470 | 550 | 276 |
| Flexural modulus (psi) | 7.03 × 10$^6$ | 9.12 × 10$^6$ | 6.8 × 10$^6$ | 7.03 × 10$^6$ |
| (MN/m$^2$) | 48,461 | 62,883 | 46,880 | 48,461 |
| Tensile strength (psi) | 52,406 | 69,525 | 51,639 | 21,286 |
| (ASTM D638; MN/m$^2$) | 362 | 480 | 356 | 147 |
| Elongation at break (%) | 4.33 | 4.89 | 2.09 | — |
| Tensile modulus (psi) | 3.0 × 10$^6$ | 4.5 × 10$^6$ | 4.4 × 10$^6$ | 2.5 × 10$^6$ |
| ASTM D738; MN/m$^2$) | 20,682 | 31,023 | 30,330 | 17,235 |
| Short beam shear (psi) | 4,280 | 5,892 | 7,749 | 3,567 |
| (ASTM D2344; MN/m$^2$) | 29.5 | 40.62 | 53.42 | 24.59 |

[a]Compared to the commonly used epoxy, Ciba-Geigy MY-720 (tetraglycidylamine of 4,4'-diaminodiphenylmethane) cured with 4,4'-diaminodiphenylsulfone (DDS).
[b]Bismaleimide of 4,4'-diaminodiphenylmethane.

EXAMPLE 9

The structure of the polymer obtained from compound (IX) was determined from its IR and NMR spectra. Based on observation of these spectra, the following structure was assigned for the resin polymer (XIII) of compound (IX).

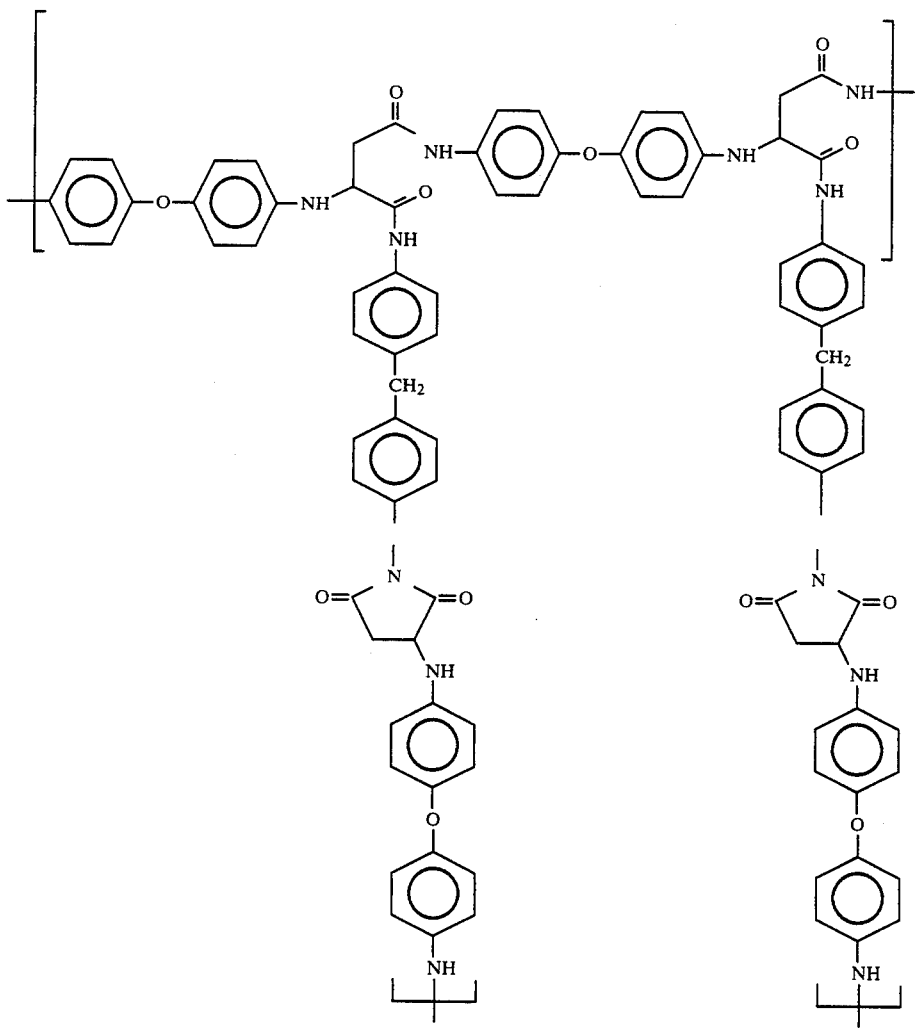

It should now be readily apparent to those skilled in the art that novel amine terminated bisaspartimides, a process for preparation of these compounds, new polymers of these compounds and laminates in accordance with the invention has been provided. It should further be apparent to those skilled in the art that various changes in form and details of the invention as described above may be made. It is intended that such changes be included within the spirit and scope of the claims appended hereto.

What is claimed is:

1. An —NH— crosslinked diamine-bismaleimide polymer having two moles of diamine per mole of bismaleimide in recurring structural units of the formula:

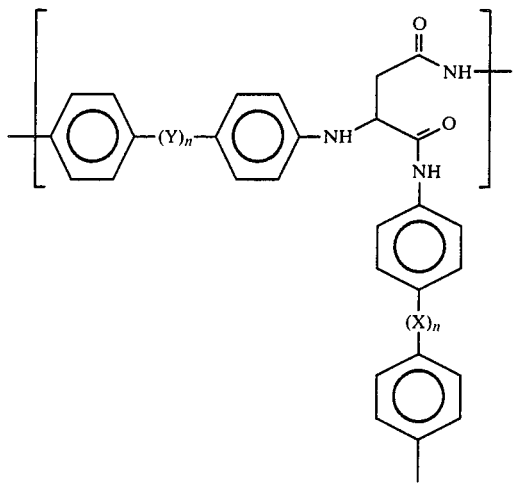

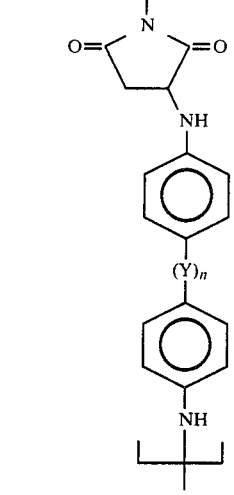

wherein X and Y are divalent radicals capable of linking two benzene rings and n is, independently in each case, an integer of 0 or 1.

2. The polymer of claim 1 in which X is —CH$_2$— and n is 1.
3. The polymer of claim 2 in which Y is —O—.
4. The polymer of claim 2 in which Y is —CH$_2$—.
5. The polymer of claim 1 in which X and Y are —CO— and n is 1.
6. An aspartimide crosslinked thermally cured resinous polymer product consisting essentially of a homopolymer of a compound having the formula:

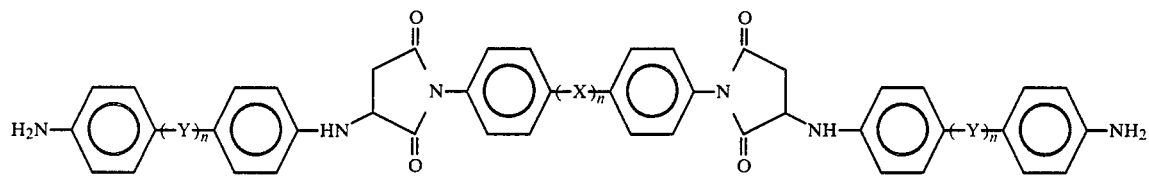

wherein X and Y are divalent radicals capable of linking two benzene rings and n is, independently in each case, an integer of 0 or 1 and wherein during thermal cure, the terminal NH$_2$ groups react with and open the internal

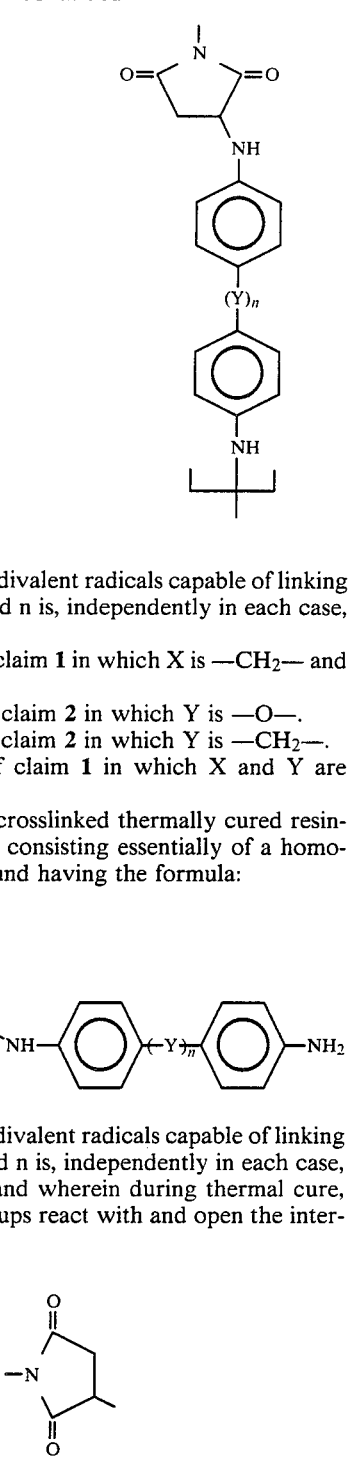

groups to form the aspartimide crosslinks.

* * * * *